No. 722,452.  
E. P. MÖSSNER.  
DOUGH CUTTER OR SLICER.  
APPLICATION FILED AUG. 5, 1902.  
NO MODEL.

PATENTED MAR. 10, 1903.

Witnesses  
Inventor  
Ernst P. Mössner  
Attorneys

UNITED STATES PATENT OFFICE.

ERNST P. MÖSSNER, OF PHILADELPHIA, PENNSYLVANIA.

DOUGH CUTTER OR SLICER.

SPECIFICATION forming part of Letters Patent No. 722,452, dated March 10, 1903.

Application filed August 5, 1902. Serial No. 118,489. (No model.)

*To all whom it may concern:*

Be it known that I, ERNST P. MÖSSNER, a subject of the Emperor of Germany, (having resided in the United States over one year last past and having declared my intention of becoming a citizen thereof,) and a resident of the city and county of Philadelphia, State of Pennsylvania, have invented new and useful Improvements in Dough Cutters or Slicers, of which the following is a specification.

My invention consists of a device for cutting and slicing dough into pieces of uniform size and in a convenient and rapid manner, the construction of parts being hereinafter described, and the novel features of the same pointed out in the claims.

Figure 1:
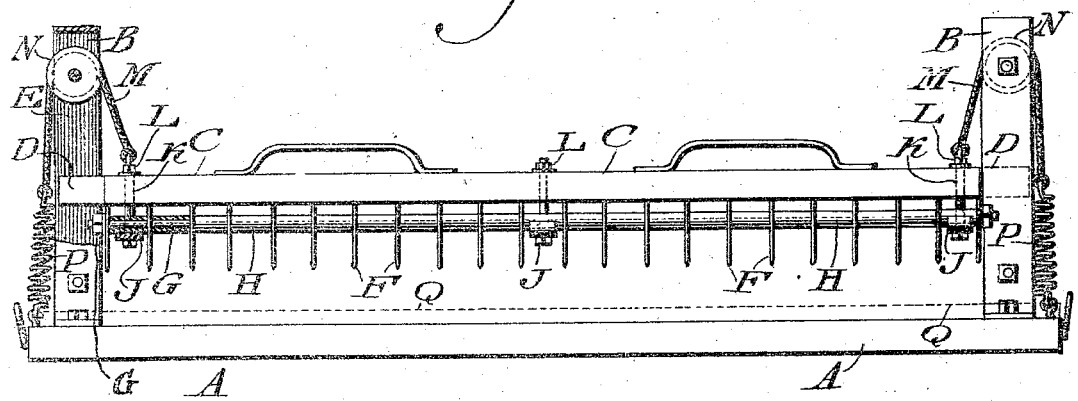
Figure 2:
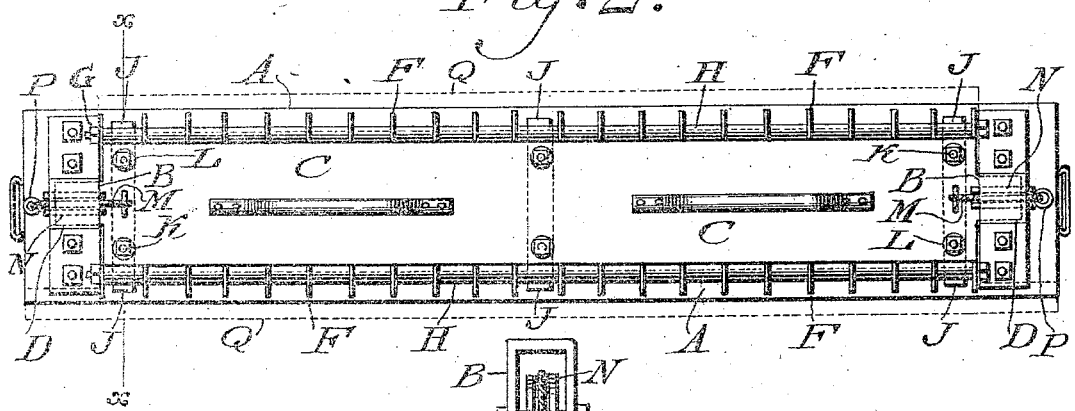
Figure 3:
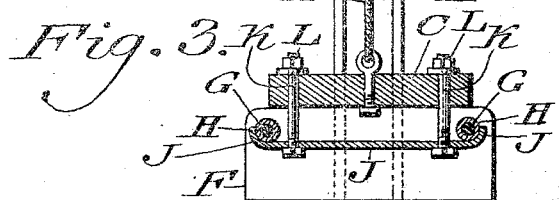

Figure 1 represents a front elevation of a dough cutter or slicer embodying my invention. Fig. 2 represents a top or plan view thereof. Fig. 3 represents a transverse vertical section on line $x$ $x$, Fig. 2.

Similar letters of reference indicate corresponding parts in the figures.

Referring to the drawings, A designates the bed or base of the device, and B designates columns or standards rising from the ends thereof.

C designates a head the ends of which are formed with tongues D, which are freely fitted in the vertically-extending openings E in the standards B, whereby said head may be lowered and raised and guided in its motions on said standards B.

F designates a series of blades or cutters which extend in vertical direction parallel to each other and are connected or coupled by the screw-rods G, which are passed through openings in the upper ends of said blades. Interposed between said blades and fitted on said rods are the sleeves H, which serve to space the blades and brace the same when the nuts G' on said rods are tightened. The blades are suspended from and connected with the heads C by means of the clamps J, which consist of cross-bars interposed between adjacent blades and having the relative sleeves H rested on the ends thereof. Bolts K are passed through said bars and said head C and tightened by the nuts L, whereby the blades are firmly connected with the head C.

M designates cords or chains which are connected with the ends of the head C and passed around pulleys N, which are mounted on the standards B, said cords or chains being also connected with the upper ends of the coiled springs P, whose lower ends are attached to the base A, the object of said springs being to raise the blades and retain them in elevated position.

The operation is as follows: A tray Q is placed on the bed A and a piece of dough rolled or otherwise shaped located on said tray beneath the blades F. Downward pressure is now applied to the head C, whereby the blades descend and cut through the dough and divide the same into slices of equal length. Then the head is let go, whereby the springs P become operative and raise said head, and with it the blades F, the latter rising from the slices. The latter may now be removed with the tray Q or from the same, as desired, after which another roll or piece of dough is applied in position and the blades are caused to descend, thus cutting or slicing said roll or piece similar to that already described.

Various changes may be made in the details of construction without departing from the general spirit of my invention, and I do not, therefore, desire to be limited in each case to the same.

Having thus described my invention, what I claim as new, and desire to secure by Letters Patent, is—

1. In a cutter or slicer of the character stated, a bed, a standard thereon, a reciprocating head, a series of spaced blades depending therefrom, a guide for said head on said standard, and means for elevating said head consisting of a spring, one end of which is attached to a fixed member, a flexible connection for said spring with said head, and a support on said standard over which said connection is passed.

2. A reciprocating head, a series of spaced blades depending therefrom, a bed, standards rising from said bed, means for guiding said head on said standards, springs attached to said bed, and connections for said springs with said head, said connections passing over pulleys on said standards.

3. In a dough cutter or slicer, a reciprocating head, a series of spaced blades depending from said head, couplings for said blades, and means for connecting said head with said blades, consisting of a cross-bar which engages with said couplings, and a bolt which is connected with said cross-bar and head.

4. In a cutter or slicer of the character stated, a reciprocating head, a series of blades depending therefrom, a rod passing through said blades, spacing-sleeves on said rod between adjacent blades, a tightening-nut on said rod, and a clamp for connecting said blades with said head, consisting of a cross-bar which engages with a sleeve between adjacent blades and a bolt which engages with said cross-bar and head and is tightened thereon.

5. A dough cutter or slicer, consisting of a series of spaced blades, rods passed through said blades for coupling the same, a reciprocating head, means for connecting said blades with said head, a base, standards rising from said base, tongues on said head guided in said standard, pulleys mounted on said standards, springs connected with said base, and cords or chains connected with said springs passing around said pulleys and attached to said head.

ERNST P. MÖSSNER.

Witnesses:
JOHN A. WIEDERSHEIM,
E. HAYWARD FAIRBANKS.